Figure 1:
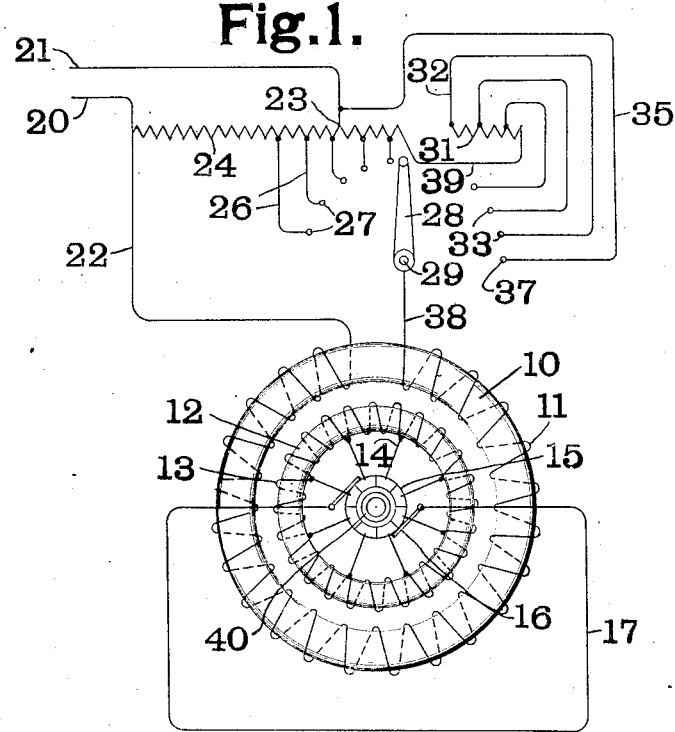

No. 851,890. PATENTED APR. 30, 1907.
W. A. LAYMAN.
METHOD OF STARTING ALTERNATING CURRENT MOTORS.
APPLICATION FILED AUG. 6, 1906.

WITNESSES:
S. G. Stout
W. H. Alexander

INVENTOR
W. A. Layman.
BY
Fowler & Bryson
ATTORNEYS

UNITED STATES PATENT OFFICE.

WALDO A. LAYMAN, OF ST. LOUIS, MISSOURI.

METHOD OF STARTING ALTERNATING-CURRENT MOTORS.

No. 851,890.    Specification of Letters Patent.    Patented April 30, 1907.

Application filed August 6, 1906. Serial No. 329,351.

*To all whom it may concern:*

Be it known that I, WALDO A. LAYMAN, a citizen of the United States, residing at the city of St. Louis, in the State of Missouri, have invented a certain new and useful Method of Starting Alternating-Current Motors, of which the following is such a full, clear, and exact description as will enable any one skilled in the art to which it appertains to make and use the same, reference being had to the accompanying drawings, forming part of this specification.

My invention relates to alternating current motors and especially to that type of such motors operated by single phase alternating current and in which the rotary member is started from rest under load as a repulsion or series motor or some equivalent of these types or combination thereof, and operates when running under load at normal speed as an induction motor. In one form of this type of motor well known in the art, the rotary member, or armature, is provided with means for predetermining the position of the poles of such member with respect to those of the stationary member or field. Such means commonly consist of a commutator and brushes, the latter being usually connected together on a locally closed or short circuit.

The object of my invention is to prevent, as far as possible, the rush of current which occurs in the line and the motor circuits at starting under load and to keep the current as nearly uniform as possible during the operation of starting, at the same time obtaining a high and practically uniform starting torque.

In the drawing accompanying this application I have illustrated one form of apparatus adapted for carrying out my method. In it Figure 1 is a diagram of such an apparatus and Fig. 2 is a diagram of curves, which will be found convenient in explaining the method which I employ.

Figure 2:
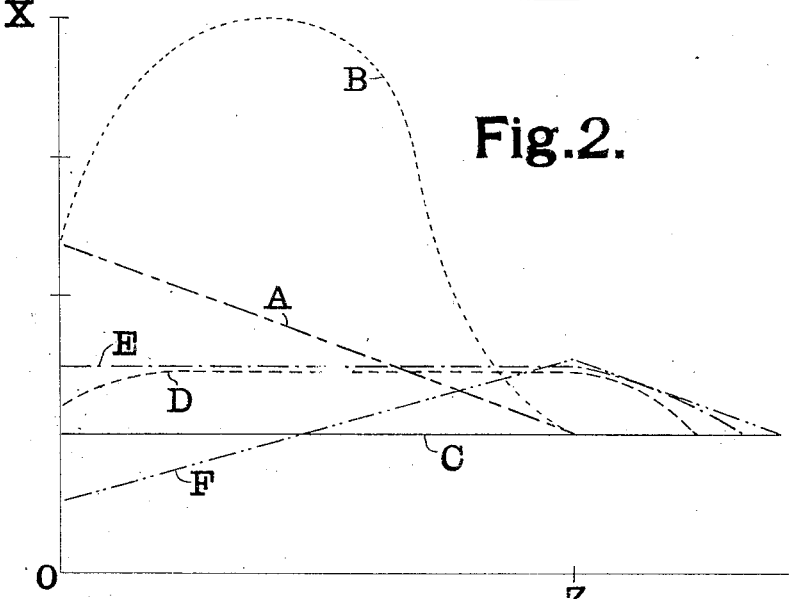

Referring to Fig. 1, 10 is the field core of the motor provided with the usual winding 11. 12 is the armature core provided with the customary winding 13, having leads 14, connected with the segments of the commutator 15, on which bear brushes, 16, connected together by a conductor 17. All of these parts are already well known in the art and I do not therefore more particularly describe them here. 20 and 21 are the line wires carrying the current to the motor and across them is connected an autotransformer in the manner now to be described: The line wire 20 is connected by a wire 22 with one of the terminals of the motor field winding and the line wire 21 is connected at 23 to an intermediate point in the coil of the autotransformer 24. Taps 26 are led out at intervals from the coil 24 and are provided with contact points 27 within reach of the switch arm 28, pivoted at 29 to move over said taps. 31 is an auxiliary coil of the autotransformer which is provided with taps 32 leading to contact points 33, also within reach of the switch arm 28. 35 is a conductor leading from the line wire 21 to a contact point 37, also within the reach of the switch arm 28. 38 is a conductor connecting switch arm 28 with the remaining terminal of the motor field winding 11, and 39 is a conductor connecting the right hand end of the coil 24 with the right hand end of the auxiliary coil 31. 40 indicates a conducting ring adapted to be clamped by any suitable means upon all of the segments of the commutator 15 to short-circuit individual coils of the armature winding 13 when the armature reaches full normal running speed under load, after the manner already well known in the art in connection with motors of this type.

When such motors are operated in the manner heretofore in use they have customarily taken at the first instant of starting about 200 to 250 per cent. of the current required when the motor is running at full or normal running speed under load, that is, when the short-circuiting ring 40 is clamped upon the armature, and have developed about 200 to 400 per cent. of the torque of the motor at normal speed under load. As the motor climbs from initial rotation to speed, the current falls off gradually from its high value at initial starting to normal full load current when normal running speed under load is attained, while the torque first rises until it reaches a maximum at approximately one-third of normal running speed under load and then falls to full load torque when normal running speed under load has been obtained. This is illustrated in the diagram of Fig. 2 where the lines O X and O Y are the customary abscissa and ordinate and Z represents the point at which normal running speed under load is attained and the contact ring 40 clamped upon the commutator. Here the line A indicates the current usually taken when the motor starts, as has heretofore been customary. B represents the rise and fall of the torque under such circumstances and C the usual constant voltage or normal operating voltage of the current supplied to the motor, i. e., the voltage at which it is designed to operate at full speed under load or normal operating voltage. With this method of starting it will be observed: First. That the initial torque is higher than necessary and the initial current very much more than desired, giving rise to a disturbance of the circuit and too much sparking at the commutator at the first instant of starting. Second. That on approaching full speed under load the torque drops to practically full load torque. In this particular instance it is desired to maintain not less than one and one-half times full load torque from starting to full normal speed, at the same time not using a larger starting current than absolutely required. This may be done by employing a reduced voltage at the first instant of starting and gradually increasing this voltage immediately after initial rotation and as normal running speed under load is being gained. When this point of normal speed under load is reached, that is, when the short-circuiting ring 40 is clamped upon the commutator 15, there is no longer any need of this increased voltage and it can therefore be gradually reduced to the normal operating voltage at which the motor is designed to operate when at normal running speed under load. I have indicated this in the diagram Fig. 2. Here the line F indicates the voltage applied to the motor and it will be noted that at starting the voltage is considerably below the normal operating voltage at which the motor is intended to operate when at normal running speed under load with the commutator short circuited. As the speed of the motor increases the voltage gradually rises until at practically one-half of normal running speed under load it reaches the normal operating voltage. As the motor draws nearer to normal running speed under load the voltage is further gradually increased until normal running speed under load is reached and the commutator is short-circuited when it is considerably above that of normal operating voltage; after which, when the commutator has been short-circuited, the voltage is gradually reduced back to that of normal operating voltage. The current under such circumstances is indicated by the curve D. As will be seen, it starts very much below the former current indicated by the line A and after rising slightly at the initial rotations of the motor remains practically constant until normal running speed under load is attained, when it is gradually reduced with the reduction of the voltage. The same may be said of the torque when my method is employed. At starting it is considerably lower than that indicated by the curve B, as the torque of the motor when former methods were employed. It remains practically constant until normal running speed under load is fully reached. Thus, as will be seen by comparing the curves B and E, giving a high torque above the normal immediately preceding the time the motor reaches normal running speed under load, after which time, upon the short-circuiting of the commutator, it is gradually reduced with the reduction of the voltage and current back to the normal. Having explained this portion of my invention, I will now describe the operation of the apparatus of Fig. 1 in carrying it out:

Let it be assumed that the pressure across the line wires 20 and 21 and at which the motor is designed to operate at full speed under load, is approximately 208 volts and that when the switch arm 28 rests on the left hand contact 27 the voltages supplied to the motor is 110. At this voltage the motor is started and by gradually rotating the arm 28 over the contacts 27 the normal voltage of 208 is reached. A further rotation of the arm 28 increases this voltage above the normal, so that when the arm 28 rests on the right hand contact 27, the voltage is at its maximum, corresponding to that point of the line F immediately above the point Z in Fig. 2. At this point the short-circuiting ring is clamped upon the commutator as the motor armature has reached full normal running speed under load. A further movement of the arm 28 places it upon the upper one of the contacts 33, completing the circuit through one section of the auxiliary coil 31 and opposing it to the coil 24, thus reducing the voltage applied to the motor. A further rotation of the arm 28 finally brings it to the contact 37 and gradually reduces the voltage back to the normal operating voltage of 208 across the mains 20 and 21 by completely cutting the autotransformer coils 24 and 31 from the circuit.

Having fully described my invention, what I claim as new and desire to secure by Letters Patent of the United States is:

1. The method of operating an alternating current motor, which consists in starting said motor on a voltage below normal operating voltage, and raising said voltage before normal running speed under load is attained.

2. The method of operating an alternating current motor, which consists in starting said motor on a voltage below normal operating voltage, and raising said voltage above normal operating voltage before normal running speed under load is attained.

3. The method of operating an alternating current motor which consists in starting said motor on a voltage below normal operating voltage, raising said voltage before normal running speed under load is attained, and reducing said voltage after said normal running speed is attained.

4. The method of operating an alternating current motor, which consists in starting said motor on a voltage below normal operating voltage, raising said voltage above normal operating voltage before normal running speed under load is attained and reducing said voltage after normal running speed under load is attained.

5. The method of operating an alternating current motor, which consists in starting said motor on a voltage below normal operating voltage, raising said voltage above normal operating voltage before normal running speed under load is attained, and reducing said voltage to normal operating voltage after said normal running speed is attained.

6. The method of operating an alternating current motor, which consists in starting said motor on a voltage below normal operating voltage, raising said voltage before normal running speed under load is attained and short-circuiting a member of said motor.

7. The method of operating an alternating current motor, which consists in starting said motor on a voltage below normal operating voltage, raising said voltage above normal operating voltage before normal running speed under load is attained and short-circuiting said motor when said normal running speed is attained.

8. The method of operating an alternating current motor, which consists in starting said motor on a voltage below normal operating voltage, raising said voltage before normal running speed under load is attained, short-circuiting said motor, and then reducing said voltage.

9. The method of operating an alternating current motor, which consists in predetermining the poles in one of the members of said motor at starting and starting said motor on a voltage below normal operating voltage, and raising said voltage before normal running speed is attained.

10. The method of operating an alternating current motor, which consists in starting said motor on commuted circuit and a voltage below normal operating voltage, and raising said voltage before normal running speed under load is attained.

11. The method of operating an alternating current motor, which consists in predetermining the poles of one of the members of said motor at starting, and starting said motor by supplying to the other member of said motor a current below normal operating voltage, raising the voltage of said current above said normal operating voltage before normal running speed under load is attained and reducing said voltage after said normal running speed has been attained.

12. The method of operating an alternating current motor, which consists in commuting the current in one of the members of said motor at starting and starting said motor by supplying to the other member thereof a current of a voltage below normal operating voltage, gradually raising said voltage after said motor has started to a point above that of normal operating voltage, short circuiting said first named member, and gradually reducing said voltage to normal operating voltage after normal running speed under load has been attained.

In testimony whereof, I have hereunto set my hand and affixed my seal in the presence of the two subscribing witnesses.

WALDO A. LAYMAN. [L. S.]

Witnesses:
   W. A. ALEXANDER,
   BENNETTE PIKE.